United States Patent Office 3,808,277
Patented Apr. 30, 1974

---

3,808,277
2-METHOXYMETHYLENE-6-METHOXY-1-TETRALONE
Francisco Alvarez, Sunnyvale, Calif., assignor to Syntex Corporation, Panama, Panama
No Drawing. Original application Jan. 18, 1971, Ser. No. 107,548, now abandoned. Divided and this application Feb. 15, 1972, Ser. No. 226,558
Int. Cl. C07c *49/82*
U.S. Cl. 260—590                     1 Claim

---

ABSTRACT OF THE DISCLOSURE

6 - methoxy - 2 - naphthylacetic acid is prepared from 6 - methoxy - 1 - tetralone by a procedure involving as intermediates, 2-methoxymethylene-6-methoxy-1-tetralone and 3,4 - dihydro - 6 - methoxy-2-naphthylcarbaldehyde. The final product has anti-inflammatory, analgesic and anti-pyretic activities.

---

This is a division of application Ser. No. 107,548, filed Jan. 18, 1971, now abandoned.

This invention relates to a process for preparing 6-methoxy-2-naphthylacetic acid and intermediates therefor.

The novel process of this invention includes the steps of reducing 2 - methoxymethylene - 6 - methoxy-1-tetralone and treating the product with acid to yield 3,4-dihydro-6-methoxy-2-naphthylcarbaldehyde, treating the latter compound with bromoform in an alkaline solution to yield 3,4 - dihydro - 6 - methoxy - 2 - naphthylhydroxyacetic acid, hydrogenating the latter compound in an alkaline solution to yield 3,4-dihydro-6-methoxy-2-naphthylacetic acid and dehydrogenating the latter compound to yield 6-methoxy-2-naphthylacetic acid.

Novel intermediates in the process of this invention include 2-methoxymethylene-6-methoxy-1-tetralone and 3,4-dihydro-6-methoxy-2-naphthylcarbaldehyde.

The process of this invention can be represented by the following formulas:

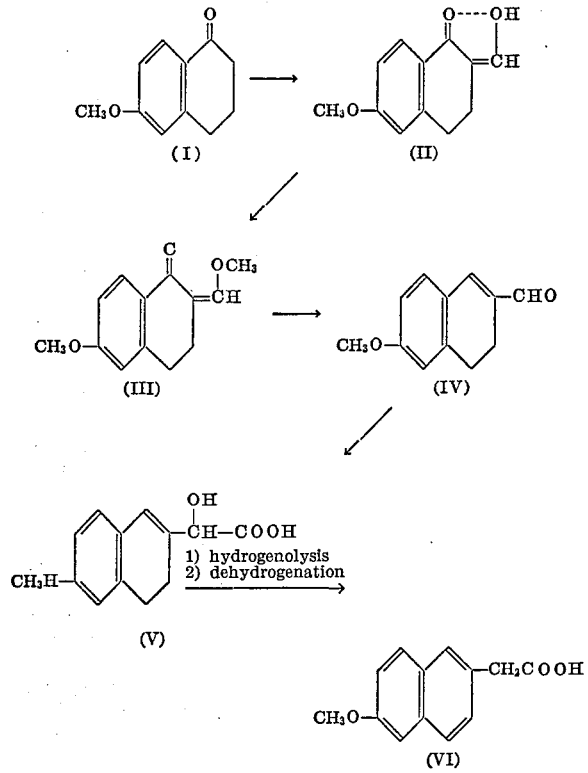

The 2 - hydroxymethylene-6-methoxy-1-tetralone of Formula II is prepared by treating the 6-methoxy-1-tetralone of Formula I with a mixture of an alkyl formate having from 2 to 4 carbons and a strong base in an inert organic solvent, followed by acid treatment. Preferably at least 1 molar equivalent of an alkyl formate and at least 2 molar equivalents of base are employed.

Suitable alkyl formates include ethyl formate, n-propyl formate, i-propyl formate, n-butyl formate, t-butyl formate and the like. Suitable strong bases include alkali metal methoxides such as sodium and potassium methoxide, sodium and potassium hydrides, sodium and potassium t-butoxides and the like. Any inert organic solvent for the reactants can be used in this process. Suitable solvents include aromatic solvents such as benzene, toluene and the like; substituted aromatic solvents such as nitrobenzene; nitro disulfide; and chlorinated alkanes such as 1,1,2,2-tetrachloroethane, carbon tetrachloride, chloroform, and the like.

The reaction is carried out at a temperature of from 0° C. to 100° C., preferably at about room temperature. The time required for the reaction depends upon the reaction temperature, times of from 15 to 100 hours usually being sufficient.

The reaction product is then separated from the reaction mixture by conventional procedures. For example, the reaction mixture can be filtered. The solid material obtained is washed with benzene and then with hexane and dried at 50 to 60° C. under vacuum for 16 to 20 hours. This material is acidified with any organic or inorganic strong acid, such as hydrochloric acid, and the solid material thus obtained is separated by filtration, washed with water until neutral, and dried to yield the compound of Formula II.

The compound of Formula II is then treated with methanol in the presence of a strong acid, and the reaction mixture obtained is treated with an excess of a strong base to yield the 2-methoxymethylene-6-methoxy-1-tetralone of Formula III. Suitable strong acids include perchloric acid, sulfuric acid, hydrochloric acid and the like. The reaction in the presence of a strong acid is carried out at a temperature of from 0 to 100° C., preferably about room temperature, for from 10 minutes to 10 hours, preferably about 2 hours. Suitable strong bases for treating the reation mixture include alkali metal alkoxides such as sodium methoxide and the like on strong bases such as sodium hydroxide, potassium hydroxide and the like. Preferably at least 10 molar equivalents of methanol and catalytic amounts of strong acid are employed. Catalytic amounts of strong acid are usually within the range of 0.01 to 0.1 molar equivalents.

The treatment with base yields a crystalline precipitate of the compound of Formula III, and the latter is separated and purified by conventional techniques. For example, the precipitate can be collected by filtration, washed with water until neutral and dried under a vacuum at 50 to 60° C.

The compound of Formula III is then reduced to yield the 3,4 - dihydro-6-methoxy-2-naphthylcarbaldehyde of Formula IV. For the reduction step, the compound of Formula III is treated with a suitable reduction agent such as sodium borohydride, lithium aluminum hydride and the like in an inert organic solvent until the keto group is reduced to a hydroxy group. Preferably, at least one molar equivalent of reducing agent is employed. Suitable inert organic solvents include lower alkanols such as methanol, ethanol, isopropanol and the like. The reaction is carried out at a temperature of from 0 to 100° C., preferably about 5° C. until the reduction is accomplished. Usually from 10 minutes to 10 hours, preferably about 2 hours is required. The reaction mixture is then carefully acidified, such as by slow addition of acid at a temperature of about 5 to 10° C. to destroy the excess of sodium borohydride and to render the reaction medium acidic. Any organic or inorganic acid can be employed in this procedure. Suitable acids include organic acids such as p-toluenesulfonic acid, trifluoroacetic acid and the like and inorganic acids include sulfuric acid, hydrochloric acid, hydrobromic acid, hydroiodic acid, and the like. The amount of acid added should be sufficient to adjust the pH of the reaction mixture to between 1 and 2.

The compound of Formula IV is then separated from the reaction mixture by conventional techniques. For example, the solvents can be removed from the reaction mixture under reduced pressure, and the residue can be collected by filtration, dissolved in methylene chloride. The organic solvent can then be eliminated under reduced pressure, and the residue recrystallized from acetone-hexane to yield the compound of Formula IV.

The carbaldehyde of Formula IV is then treated with a mixture of bromoform and a base in an inert organic solvent. Suitable bases include alkali metal hydroxide such as potassium hydroxide, sodium hydroxide and the like. Preferably, the reaction mixture should contain an alkali metal halide such as lithium chloride. This reaction is carried out at a temperature of from 0 to 100° C., preferably about 5 to 10° C. for from 10 to 100 hours, preferably about 24 hours. Preferably at least 1 molar equivalent of bromoform and 4 molar equivalents of base is employed.

The 3,4-dihydro-6-methoxy-2-naphthylhydroxyacetic acid of Formula V is then separated from the reaction mixture by conventional procedures. For example, the reaction mixture can be diluted with water, extracted with ether, and the ether phase can be dried, evaporated to dryness under reduced pressure, and the residue recrystallized from acetone-hexane to yield the compound of Formula V.

The 6-methoxy-2-naphthylacetic acid of Formula VI is prepared by reducing the compound of Formula V to yield the 3,4-dihydro-6-methoxy-2-naphthylacetic acid which is then dehydrogenated to yield the compound of Formula VI.

The reduction is carried out by treating the hydroxyacetic acid of Formula V with palladium-on-charcoal, platinum oxide or platinum under a hydrogen atmosphere in an alkaline solution, the solvent of which is inert to the reactants. Suitable solvents include water and lower alkanols. The alkaline component in the reaction mixture can be an alkali metal hydroxide such as sodium or potassium hydroxide. This reaction is carried out until the required reduction is accomplished, usually for about 1 to 100 and preferably about 10 hours.

The reaction mixture is then acidified with any organic or inorganic acid, and the 3,4-dihydro-6-methoxy-2-naphthylacetic acid is separated from the reaction mixture by conventional procedures.

For example, the precipitate of this compound can be collected by filtration, washed with water until neutral, and dried.

The 3,4-dihydro-6-methoxy-2-naphthylacetic acid is then dehydrogenated to yield the 6-methoxy-2-naphthylacetic acid of Formula VI.

The dehydrogenation can be accomplished by treating the 3,4-dihydro compound with an excess of sulfur at a temperature of from 200 to 300° C. preferably about 250 to 270° C. for from 1 to 100 hours, preferably about 2 hours. The compound of Formula VI is then separated from the reaction mixture by conventional techniques. For example, the reaction mixture can be cooled to room temperature, and dissolved in methylene chloride. This mixture can then be extracted with an aqueous alkaline solution such as a solution of an alkali metal hydroxide in water. The alkaline extracts are then acidified, and the precipitate is collected by filtration, washed with water until neutral, dried under vacuum and recrystallized from acetone-hexane to yield the compound of Formula VI. Alternatively, the 3,4-dihydro-6-methoxy-2-naphthylacetic acid can be dehydrogenated by refluxing an aromatic solvent such as benzene p-cymene, etc. in the presence of 10 percent palladium-on-charcoal or by refluxing in an aromatic solvent such as benzene with at least 2 molar equivalents of 2,3-dichloro-5,6-dicyano-1,4-benzoquinone.

2-(6-methoxy-2-naphthyl)acetic acid exhibits anti-inflammatory, analgesic and anti-pyretic activities and is accordingly useful in the treatment of inflammation, pain and pyrexia in mammals. For example, inflammatory conditions of the muscular skeletal system, skeletal joints and other tissues can be treated. Accordingly, this compound is useful in the treatment of conditions characterized by inflammation such as rheumatism, concussion, laceration, arthritis, bone fractures, post-traumatic conditions and gout.

This invention is further illustrated by the following specific but non-limiting examples.

EXAMPLE 1

A solution of 100 g. of 6-methoxy-1-tetralone in 1000 ml. of benzene is treated with 50 g. of sodium methoxide and 50 ml. of ethyl formate. The mixture is stirred at room temperature overnight. Then the mixture is filtered, and the solid material washed with benzene, then with hexane, and dried at 50–60° C. under vacuum for 60 to 20 hours. The solid dried material so obtained is added in portions to 3 liters of water containing excess hydrochloric acid. The solid material so obtained is collected by filtration and washed with water until neutral.

The wet cake of 2-hydroxymethylene-6-methoxy-1-tetralone is then dried under vacuum at 50 to 60° C. and treated with 1000 ml. of anhydrous methanol and 0.5 ml. of a 70 percent perchloric acid solution at room temperature for a period of 2 hours with mechanical stirring and anhydrous conditions. Then the mixture is treated with 2 g. of solid sodium methoxide, and the reaction mixture is diluted with water to a volume of 10 liters. The crystalline precipitate so obtained is collected by filtration, washed with water until neutral and dried under vacuum at 50 to 60° C. to yield 2-methoxymethylene-6-methoxy-1-tetralone.

The latter compound is treated with 1000 ml. of methanol and a molar excess of sodium borohydride at room temperature for a period of 2 hours to yield 1,2,3,4-tetrahydro-1-hydroxy-2-methoxymethylene-6-methoxynaphthylene, and the reaction mixture is then cooled, such as by means of an external ice-water bath to 5 to 10° C.; then concentrated hydrochloric acid is slowly added to destroy the excess of sodium borohydride and to render the medium acidic. The acid addition is continued until the pH of the reaction medium is between 1 and 2. The reaction mixture is then diluted with 1000 ml. of water, and the organic solvent is eliminated under reduced pressure. The gummy material obtained is collected by filtration, dissolved in methylene chloride and dried under anhydrous sodium sulfate. The organic solvent is eliminated under reduced pressure, and the residue crystallized from acetone: pentane to yield 3,4-dihydro-6-methoxy-2-naphthylcarbaldehyde. To a mixture of 0.5 ml. of lithium chloride, 1.0 g. of potassium hydroxide and 200 g. of ice is added 200 ml. of dioxane, 0.25 mole of 3,4-dihydro-6-methoxy-2-naphthylcarbaldehyde and 0.25 mole of bromoform. This mixture is maintained at a temperature of 5 to 10° C. with stirring for 24 hours, and then is maintained at a temperature of 30 to 35° C. for another 24 hours. The solution is then diluted with 600 ml. of water and extracted with ether. The aqueous layer is then acidified to a pH of about 1 and extracted with ether several times. The combined ether extracts from this last operation are dried under anhydrous sodium sulfate, and the solvent is eliminated under reduced pressure. The residue is crystallized from acetone-hexane to yield 3,4-dihydro-6-methoxy-2-naphthylhydroxyacetic acid.

100 grams of the latter compound is dissolved in 1 liter of water containing excess sodium hydroxide. The solution is then treated with 20 g. of a 10 percent palladium-on-charcoal catalyst under a hydrogen atmosphere of 60 p.s.i. for a period of 10 hours with stirring. The solution is filtered through a layer of celite, and the resulting solution is acidified with concentrated hydrochloric acid. The resulting crystalline precipitate of 3,4-dihydro-6-methoxy-2-naphthylacetic acid is collected by filtration, washed with water until neutral, and dried at 90° C. under vacuum.

The latter compound is mixed with sulfur, and the mixture is heated to 250 to 270° C. with stirring. When evolution of hydrogen sulfide ceases, the mixture is cooled to room temperature. The residue is dissolved in methylene chloride and extracted with an aqueous 2 percent sodium hydroxide solution. The alkaline extracts are treated with charcoal and filtered through a layer of celite. The filtrates are acidified with hydrochloric acid, and the precipitate of 6-methoxy-2-naphthylacetic acid is collected by filtration, washed with water until neutral, dried at 80° C. under vacuum, and recrystallized from acetone-hexane.

I claim:
1. 2-methoxymethylene-6-methoxy-1-tetralone.

References Cited
FOREIGN PATENTS
904,508    8/1962    Great Britain _____ 260—590

DANIEL D. HORWITZ, Primary Examiner

U.S. Cl. X.R.
260—520, 600

UNITED STATES PATENT OFFICE
CERTIFICATE OF CORRECTION

Patent No. 3,808,277　　　　　　　　　Dated April 30, 1974

Inventor(s) Francisco Alvarez

It is certified that error appears in the above-identified patent and that said Letters Patent are hereby corrected as shown below:

Column 1, lines 60-65, that portion of Formula (V) reading

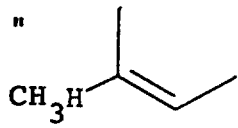 should read 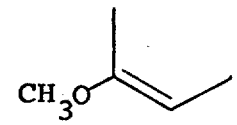.

Signed and sealed this 15th day of April 1975.

(SEAL)
Attest:

RUTH C. MASON
Attesting Officer

C. MARSHALL DANN
Commissioner of Patents
and Trademarks